United States Patent
Zhuang et al.

(10) Patent No.: US 9,620,929 B2
(45) Date of Patent: Apr. 11, 2017

(54) LASER LIGHTING DEVICE

(71) Applicant: SHENZHEN PROTRULY ELECTRONICS CO., LTD., Shenzhen (CN)

(72) Inventors: Min Zhuang, Shenzhen (CN); Peng Lu, Shenzhen (CN)

(73) Assignee: Shenzhen Protruly Electronics Co., Ltd., Shenzhen (CN)

( * ) Notice: Subject to any disclaimer, the term of this patent is extended or adjusted under 35 U.S.C. 154(b) by 464 days.

(21) Appl. No.: 13/968,042

(22) Filed: Aug. 15, 2013

(65) Prior Publication Data

US 2014/0218928 A1    Aug. 7, 2014

(30) Foreign Application Priority Data

Feb. 1, 2013    (CN) .......................... 2013 1 0040311

(51) Int. Cl.
| | |
|---|---|
| *H01S 5/00* | (2006.01) |
| *G02B 26/08* | (2006.01) |
| *F21V 14/06* | (2006.01) |
| *F21V 5/00* | (2015.01) |
| *F21Y 101/00* | (2016.01) |
| *F21Y 115/30* | (2016.01) |

(52) U.S. Cl.
CPC .............. *H01S 5/005* (2013.01); *F21V 14/06* (2013.01); *G02B 26/0875* (2013.01); *F21V 5/007* (2013.01); *F21Y 2101/00* (2013.01); *F21Y 2115/30* (2016.08)

(58) Field of Classification Search
CPC ..... F21V 14/06; F21V 5/007; G02B 26/0875; F21Y 2115/30; F21Y 2101/00
See application file for complete search history.

(56) References Cited

FOREIGN PATENT DOCUMENTS

| | | |
|---|---|---|
| CN | 101142856 A | 3/2008 |
| CN | 101218467 A | 7/2008 |
| CN | 101382657 A | 3/2009 |
| CN | 201221753 Y | 4/2009 |
| CN | 201368406 Y | 12/2009 |
| CN | 201837808 U | 5/2011 |
| CN | 102292590 A | 12/2011 |
| CN | 202433659 U | 9/2012 |
| CN | 202443233 U | 9/2012 |
| CN | 102844895 A | 12/2012 |
| EP | 1770693 B1 * | 8/2010 |

\* cited by examiner

*Primary Examiner* — Anne Hines
(74) *Attorney, Agent, or Firm* — Muncy, Geissler, Olds & Lowe, P.C.

(57) ABSTRACT

The present invention discloses a laser lighting device, includes a laser device, used to emit lasers; a power supply, connecting to the laser device; a battery of lenses, locates at the same optical axis with the laser device; a regulating device, used to regulate exit angles of the lasers passing through the battery of lenses; a controlling device, connecting to the power supply and the laser device separately, used to receive and based on the users' control instructions to control the laser device emitting lasers at corresponding exit angles, and/or control the power supply outputting corresponding powers. The laser lighting device can regulate the laser exit angles through the regulating device, and receive and based on users' control instructions to control both laser brightnesses and laser exit angles. The present invention has the advantages of high efficiency and energy saving.

9 Claims, 1 Drawing Sheet

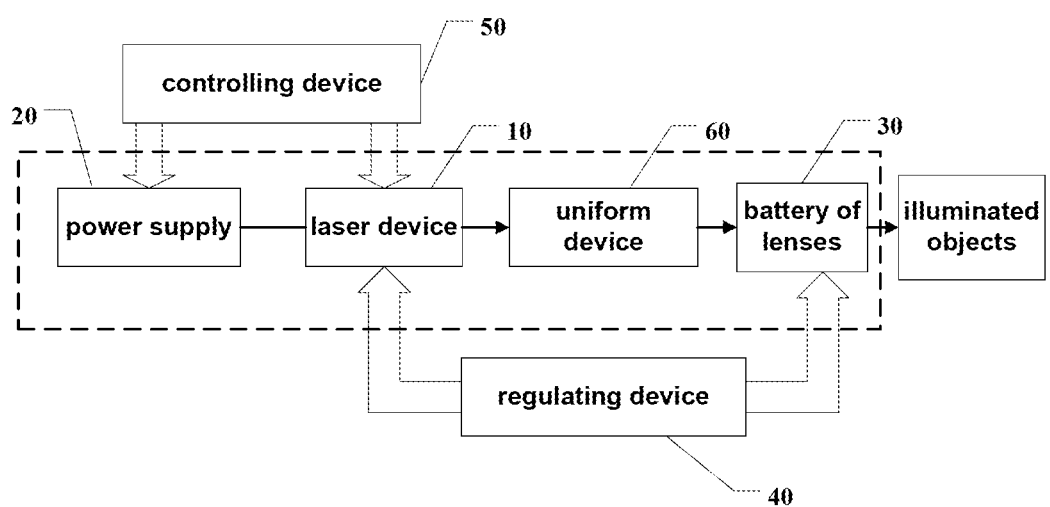

LASER LIGHTING DEVICE

CROSS-REFERENCES TO RELATED APPLICATIONS

This application claims the priority of Chinese patent application no. 2013100403116, filed on Feb. 1, 2013, the entire contents of all of which are incorporated herein by reference.

FIELD OF THE INVENTION

The present invention relates to the field of laser lighting, and more particularly, to a laser lighting device with both laser exit angle and laser brightness adjustable.

BACKGROUND

With the development of lighting technique, comparing to the traditional lighting devices, laser lighting device has the advantages of high efficiency, energy saving, environmental protection and more. More and more laser lighting devices have been applied to the fields, including landscape lighting, street lighting, city lighting, home lighting, industrial lighting, automotive headlights and a plurality of long distance night monitoring systems.

However, laser lighting devices in the prior art has the following defects: 1) They are unable to flexibly adjust the brightnesses of the illumination lasers. 2) They can only emit laser with a fixed exit angle, and the laser lighting range is narrow. Those means they are not good enough to meet the specific needs in certain cases.

Therefore, the prior art needs to be improved and developed.

BRIEF SUMMARY OF THE DISCLOSURE

The technical problems to be solved in the present invention is aiming at the defects of the prior art, providing a laser lighting device, in order to solve the problems in the prior art, that is, neither the laser exit angles nor the laser brightnesses of the laser lighting devices in the prior art is adjustable.

The technical solution adopted in the present invention to solve the technical problems is as below:

a laser lighting device including a laser device, used to generate and emit laser, also includes:

an adjustable power supply, connecting to the said laser device;

a battery of lenses, locating at the same optical axis of the said laser device, the said battery of lenses contains at least one pair of concave and convex lenses, and the relative positions of the said concave and convex lenses are adjustable;

a regulating device, connecting to the said laser device and the said battery of lenses separately, configured to regulate the exit angles of the lasers passing through the said battery of lenses; and a controlling device, connecting to the said power supply and the said laser device separately, configured to receive control instructions from users and control the said laser device emitting lasers at corresponding exit angles, and/or control the said power supply outputting corresponding powers based on the control instructions from the users.

The said laser lighting device, wherein, the said power supply controls the said laser device emitting lasers with corresponding brightnesses, through outputting different powers.

The said laser lighting device, wherein, the said regulating device is also used to transform the lasers emitted from the said laser device to white light.

The said laser lighting device, wherein, the said regulating device adjusts the relative positions of the concave and convex lenses in the battery of lenses by controlling a stepper motor through PID (Proportion Integration Differentiation), thus adjusts the exit angles of the lasers passing through the said battery of lenses.

The said laser lighting device, wherein, the said regulating device adjusts the exit angles of the lasers passing through the said battery of lenses by regulating the distances between the said laser device and the said battery of lenses.

The said laser lighting device, wherein, a uniform device is arranged between the said laser device and the said battery of lenses, configured to homogenize the lasers, while the said laser device, the said uniform device, and the said battery of lenses are arranged at the same optical axis.

The said laser lighting device, wherein, the said controlling device receives the users' control instructions through a preset communication interface, and through controlling a MCU integrating PWM-DA function to adjust the output voltages or output currents of the said power supply, thus controls the said power supply outputting corresponding powers.

The said laser lighting device, wherein, the said controlling device receives the users' control instructions through a preset communication interface, to control the working parameters of the said laser device by controlling the stepper motor through PID subprogram, thus controls the said laser device emitting lasers at corresponding exit angles.

The said laser lighting device, wherein, the said laser device is a semi-conductor laser light source.

The said laser lighting device, wherein, the said laser device emits lasers in green, blue or red.

The laser lighting device as provided in the present invention, has the benefits of being able to adjust the lasers exit angles, brings a wide laser lighting range for the laser lighting device, while being able to adjust the laser brightnesses based on the actual situations. Thus it helps to achieve the benefits of high efficiency, energy saving and environmental protection.

BRIEF DESCRIPTION OF THE DRAWINGS

The sole FIGURE illustrates a structural schematic diagram of an embodiment of the laser lighting device of the present invention.

DETAILED DESCRIPTION

In order to make the purpose, technical solution and the advantages of the present invention clearer and more explicit, further detailed descriptions of the present invention is stated here, referencing to the attached drawing and some embodiments of the present invention. It should be understood that the detailed embodiments of the invention described here are used to explain the present invention only, instead of limiting the present invention.

The laser lighting device as provided in the embodiment of the present invention, whose laser exit angles and brightnesses are adjustable, referred to the FIGURE, includes: a laser device 10, a power supply 20, a battery of lenses 30, a regulating device 40 and a controlling device 50. The said laser device 10 used to emit lasers, and, the power supply 20, whose powers are adjustable, connecting to the said laser device 10, to control the said laser device emitting lasers at corresponding brightnesses through outputting different powers; The battery of lenses 30, locates at the same optical axis with the said laser device, contains at least one pair of concave and convex lenses, wherein, the positions of the concave and convex lenses are adjustable. The battery of lenses 30 is used to expand or focus the laser beam passing through the said battery of lenses accordingly; The regulating device 40, connecting to the said laser device and the battery of lenses separately, used to regulate the exit angles of the lasers passing through the said battery of lenses 30; and the controlling device 50, connecting to the said power supply 20 and the said laser device 10 separately, which is used to receive the users' control instructions and control the said laser device 10 emitting lasers at the corresponding exit angles, and/or control the said power supply 20 outputting the corresponding powers based on the users' control instructions, finally achieve the effect of controlling the said laser device emitting lasers with according brightnesses.

In the present embodiment, preferably, the concave lens is arranged between the said laser device and the said convex lens, i.e., expanding the laser beam first, and then focusing the laser beam.

Preferably, the said laser device 10 is a semi-conductor laser light source, includes but not limited to laser diodes or laser diodes with optical fibers output, which can give off green, blue or red lasers. The said regulating device 40 is also used to transform the said green, blue or red lasers into white light, and the transformed white light gets expanding and focusing through the said battery of lenses.

For better, a uniform device 60 is set between the said laser device and the said battery of lenses, while the said laser device 10, the said uniform device 60 and the said battery of lenses 30 locate at the same optical axis. A plurality of optical splitters or optical fibers, including frosted glass, multifaceted prism, or mesh sieve can be selected to homogenize the lasers, so as to overcome the defects of uneven distribution of power in lasers generated in the semi-conductor laser devices, thus improves the condition of uneven light and shade stripes.

When regulating the laser exit angles of the said laser lighting device through the said regulating device 40, it is possible to be achieved by using the said regulating device to regulate the relative positions of the concave and convex lenses in the said battery of lenses by controlling a stepper motor through a PID (Proportion Integration Differentiation), or by regulating the distance between the said laser device 10 and the said battery of lenses 30. The said PID is a widely used regulating controlling method in the engineering practice.

Preferably, a communication interface together with an MCU integrating PWM-DA function (Pulse Width Modulation), is arranged in the said controlling device 50. The said communication interface is able to receive the users' control instructions. PWM signal is a digital signal with fixed cycles and indefinite duty ratios. If the duty ratio of the PWM signal shifts with time, then the output signals after filtering will be analog signals with changing amplitudes. Therefore, by controlling the duty ratio of the PWM signals, it is possible to generate different analog signals. The said controlling device receives users' control instructions through the said communication interface, when the said user's instructions are the instructions for regulating the laser brightness, through controlling the MCU integrating PWM-DA function to adjust the output voltages or output currents of the said power supply for controlling the corresponding output powers of the said power supply, further control the said laser device emitting lasers with different brightnesses; or, when the said users' control instructions are the instructions for regulating the laser exit angles, to control the working parameters of the said laser device by controlling the stepper motor through PID subprogram, thus controls the said laser device emitting lasers at the corresponding exit angles.

In summary, the laser lighting device provided in the present invention with both laser exit angles and laser brightnesses adjustable, is not only able to regulate the laser exit angles through a regulating device, but also receive the users' control instructions to achieve the control to both the laser lightnesses and exit angles based on the received users' control instructions. It has the advantages of high efficiency and energy saving.

It should be understood that, the application of the present invention is not limited to the above examples listed. It will be possible for a person skilled in the art to make modifications or replacements according to the above description. All of these modifications or replacements shall all fall within the scope of the appended claims of the present invention.

What is claimed is:

1. A laser lighting device, comprising:
    a laser device, used to emit laser;
    an adjustable power supply, connected to the laser device;
    a battery of lenses, located at the same optical axis of the laser device, the battery of lens contains at least one pair of concave and convex lenses, the positions of the concave and convex lenses are adjustable;
    a regulating device, connected to the laser device and the battery of lenses separately, used to regulate exit angles of lasers passing through the battery of lenses, wherein the regulating device is also used to transform lasers emitted from the laser device to white light; and
    a controlling device, connected to the power supply and the laser device separately, used to receive control instructions from users and control the laser device emitting lasers at corresponding exit angles, and/or control the power supply outputting corresponding powers based on users' control instructions to turn on, turn off and adjust a brightness of the white light.

2. The laser lighting device according to claim 1, wherein, the power supply controls the laser device emitting lasers with corresponding brightnesses through outputting different powers.

3. The laser lighting device according to claim 1, wherein, the regulating device regulates the relative positions between the concave and convex lenses in the battery of lenses by controlling a stepper motor through PID, thus regulates the exit angles of the lasers passing through the battery of lenses.

4. The laser lighting device according to claim 1, wherein, the regulating device regulates the exit angles of the lasers passing through the battery of lenses by regulating the distances between the laser device and the battery of lenses.

5. The laser lighting device according to claim 1, wherein, a uniform device, used to homogenize the lasers, is arranged between the laser device and the battery of lenses, while the laser device, the uniform device, and the battery of lenses are arranged in the same optical axis.

6. The laser lighting device according to claim 1, wherein, the controlling device receives the users' control instructions through a preset communication interface, and through controlling a MCU integrating PWM-DA function to regulate output voltages or output currents of the power supply, thus controls the power supply outputting corresponding powers.

7. The laser lighting device according to claim 6, wherein, the controlling device receives the users' control instructions through the preset communication interface, to control working parameters of the laser device by controlling a stepper motor through a PID subprogram, thus controls the laser device emitting lasers at the corresponding exit angles.

8. The laser lighting device according to claim 1, wherein, the laser device is a semi-conductor laser light source.

9. The laser lighting device according to claim 1, wherein, the laser device emits lasers in green, blue or red.

* * * * *